Dec. 11, 1934.                F. H. LANE ET AL                1,983,764
        METHOD OF COVERING WIRES, THREADS, AND FILAMENTS WITH RUBBER COMPOSITION
                                Filed Feb. 11, 1932
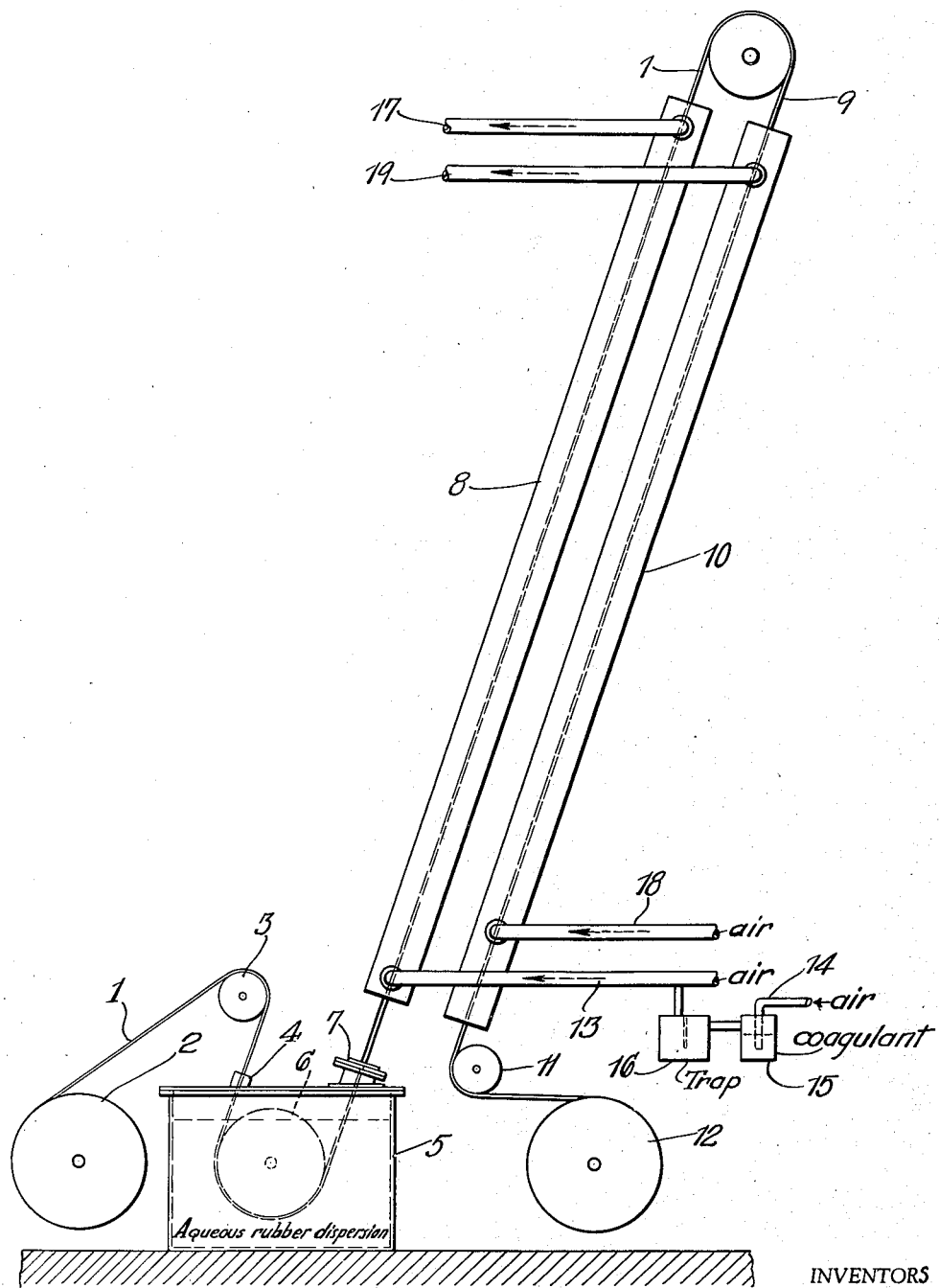
INVENTORS
FREDERICK HENRY LANE
EVELYN WILLIAM MADGE
BY EDWARD ARTHUR MURPHY
ATTORNEYS Patented Dec. 11, 1934

1,983,764

UNITED STATES PATENT OFFICE 1,983,764

METHOD OF COVERING WIRES, THREADS, AND FILAMENTS WITH RUBBER COMPOSITION

Frederick Henry Lane, Evelyn William Madge, and Edward Arthur Murphy, Birmingham, England, assignors to Dunlop Rubber Company Limited, London, England, a British corporation Application February 11, 1932, Serial No. 592,435
In Great Britain February 16, 1931

10 Claims. (Cl. 91—68)

This invention consists in an improved process and apparatus for providing wire thread-like and filamentary materials with a coating of india rubber, gutta-percha, balata or similar materials or mixtures of the same, and is an improvement in or modification of the process and apparatus described in Patent 1,857,987, May 10, 1932, hereinafter referred to as the main patent.

In the specification of said main patent a process and apparatus are described and claimed for the covering or coating of wire or thread-like and filamentary materials which consists in passing the same through a bath containing a concentrated and/or compounded aqueous dispersion of rubber, gutta-percha, balata or similar materials or more than one of these materials in the form of a cream or viscid fluid causing it to emerge therefrom coated or covered uniformly with the cream or viscid fluid and then drying the coating without allowing it to contact with any solid foreign body substantially as described therein. For instance, the wire or thread-like or filamentary material can be made to emerge from the bath through a tube of glass or other suitable material having a constricted part or neck disposed of at or near the surface of the dispersion.

By this construction the upper end of the tube forms a kind of cup into which a portion of the latex is drawn by the moving wire or filament which therefore finally issues from a small concentric circular surface of the dispersion thereby ensuring a smooth and even distribution of the adherent deposit.

The construction also tends to check the accidental passage of air bubbles of the bath into the cup. The wire or filamentary material issuing from the tube is therefore coated with a fine uniform and smooth deposit, and according to the main patent is passed through a suitably warm space or vessel to dry the deposit.

Both the coating and the drying are effected according to the main patent without the coating or covering being touched in any way.

The object of the present invention is to accelerate the process for the production of covered or coated wire, thread-like or filamentary material.

According to the present invention the process for covering or coating wire, thread-like and filamentary material comprises passing same through a bath containing aqueous dispersions of the kinds hereinafter specified in the form of a cream or viscid fluid causing it to emerge therefrom coated or covered uniformly with the cream or viscid fluid substantially as described and claimed in the main patent, coagulating the coating or covering by contacting it with a gaseous or liquid coagulant preferably by subjecting the coating or covering to a spray or gaseous or vaporous current containing or consisting of a coagulant so that the coating is in a substantially coagulated condition before allowing it to contact with any solid body and finally drying the coagulated coating or covering.

Alternatively or additionally the coating or covering can be set by a spray containing or consisting of setting means.

If thick coatings or coverings are desired these can be obtained by the application of plurality of deposits of the aqueous dispersion aforesaid, alternating with for instance coagulant spray treatment.

The wire thread-like or filamentary material can be made for instance to pass successively through baths containing the aforesaid aqueous dispersion, each fresh coating or covering of dispersion being coagulated or set before the application of the next by the provision of coagulating or setting means between the successive baths.

The emulsions or dispersions of rubber or the like comprise or consist of or contain rubber, gutta-percha, balata or similar vegetable resins, occurring naturally or artificially obtained. Such artificial aqueous dispersion may include those of coagulated rubber, vulcanized rubber, synthetic rubber, waste or reclaim.

If desired, any of the aforesaid dispersions may be used alone or in admixture with one another. Any of the aforesaid dispersions may contain the usual known compounding and vulcanizing ingredients and/or are preferably in concentrated form.

Concentrates such as are obtained in U. S. Patent 1,846,164, February 23, 1932 or in British Patent 219,635 to which may be added any one or more of the usual compounding ingredients may also be used.

The coagulating current of gas or vapor can be for example cold or heated acetic or formic acid.

Coagulation or setting of the deposits is preferably effected by the delivery of the coagulant in the form of a spray or gaseous or vaporous current or of the setting means in the form of a spray on the said deposits. The coagulant or setting means is thereby contacted with the non-coagulated coating or covering in uniform and convenient manner.

The setting means employed may be for example, the liquids described and claimed in British Patent 303,544—i. e. liquids which effect substantial dehydration and setting by operating partly or entirely under continuous penetrative osmotic action.

Examples of carrying the invention into effect are as follows:—

Example 1

Cotton yarn or thread is passed round a pulley immersed in a bath containing a latex mixing prepared according to U. S. Patent 1,846,164 and application Ser. No. 316,722 filed November 2, 1928 having a total solid content of 68% and of the following composition:—

| | Parts by weight |
|---|---|
| Rubber | 87.2 |
| Sulphur | 2.0 |
| Tetramethyl-thiuram-disulphide | 0.3 |
| Zinc oxide | 4.0 |
| Transformer oil | 5.0 |
| Carbon black | 1.5 |

The yarn or thread emerges through a special tube of the kind described and shown in the main patent, the tube being inclined at an angle of about 30° to the vertical. After leaving the tube the yarn or thread coated with the latex mixing passes through a small chamber wherein it is uniformly subjected to a spray of 20% solution of acetic acid. As the coated yarn or thread is inclined at an angle the liquid coagulant has less tendency to run rapidly down the coated thread into the tube. The upward movement of the thread also prevents this.

In the spray enclosure, which is also inclined at an angle any extra liquid coagulant drops vertically downwards and can be collected without it dropping into the tube itself.

During the short travel of the coated yarn or thread after leaving the spray chamber the coating is sufficiently set to prevent distortion and sticking to the winding or directing pulleys.

The set coating is dried and vulcanized and the thread is batched up in known manner.

Example 2

Cotton yarn or thread is passed round a pulley immersed in a bath containing a latex mixing of 30% solid content and of the following composition:—

| | Parts by weight |
|---|---|
| Rubber | 100 |
| Sulphur | 2.7 |
| Tetramethyl-thiuram-disulphide | 0.5 |
| Zinc oxide | 1.0 |
| Mineral oil | 5.0 |
| Pigment | 3.0 |

The yarn or thread emerges directly from the surface of the mixing and passes immediately into a vertical tube situated immediately above it through which hot air is blown.

The process may be carried out in any of various suitable types of apparatus. Such an apparatus as is shown in Patent 1,857,987 may be employed.

In the accompanying drawing apparatus similar to that of said Patent 1,857,987, but having inclined tubes, is shown.

In this apparatus a filament 1 is drawn from a suitable supply reel 2 over a pulley 3 and thence through an orifice 4 into a body or bath of latex 5. It passes about a curved pulley 6 in the bath 5 and then through an outlet 7 similar to that described in Patent 1,857,987. All of this part of the apparatus may be of the construction shown in the aforesaid patent. After leaving the outlet 7 the filament passes upwardly through an inclined tube or chamber 8, thence over a pulley 9 and downwardly through a second inclined tube or chamber 10. It then passes about a guide roller 11 to a receiving reel 12. Hot air is supplied to the tube 8, preferably at the lower part of the tube, through an inlet pipe 13.

At the bottom or entrance end of the tube a slow additional current of air is injected through a pipe 14, charged with acetic acid vapour. The latter is effected by bubbling the air through glacial acetic acid contained in an aspirator 15. A trap 16 is also included in the circuit to ensure that no actual liquid is spattered into the tube and falls into the mixing thus causing coagulation. The mixture of air and unused coagulant is withdrawn through an outlet or exhaust pipe 17. Similarly, air or air and coagulant are supplied to the tube 10 through an inlet pipe 18 and withdrawn through an outlet pipe 19.

The passage of the yarn through the tube is sufficient for the impregnation or coating to be set sufficiently to give an inappreciable distortion or sticking in passing over directing or winding pulleys. Partial drying also takes place during the passage through this tube.

What we claim is:

1. A process for coating a filamentary article which comprises drawing said article upwardly through the surface of an aqueous dispersion of coating material to form a coating of said dispersion on the surface of said article, exposing said coating to a coagulating medium to coagulate and set the dispersed particles of said dispersion sufficient to resist distortion and sticking of said coating, and then drying said coating.

2. A process of coating a filamentary article which comprises drawing said article upwardly through the surface of an aqueous dispersion of coating material to form a coating of said dispersion on the surface of said article, exposing said coating to a coagulating and dehydrating medium to coagulate and abstract water by osmosis from said coating and thereby to set the dispersed particles of said dispersion sufficiently to resist distortion and sticking, and then drying said coating.

3. An improved process as claimed in claim 1 wherein gaseous current comprising a coagulant is employed to coagulate the coating or covering.

4. An improved process as claimed in claim 1 wherein a spray comprising dehydrating and setting means is employed to set the coating or covering.

5. An improved process as claimed in claim 1 wherein the coagulating current comprises acetic acid.

6. An improved process as claimed in claim 1 wherein the coagulating current comprises formic acid.

7. An improved process as claimed in claim 1 wherein a plurality of deposits of the aqueous dispersions aforesaid are applied and each deposit is solidified prior to the application of the next one.

8. An improved process as claimed in claim 1 wherein the wire, thread-like or filamentary material is passed successively through baths containing the aqueous dispersions each fresh coating or covering of dispersion being coagulated or set before the application of the next by the provision of coagulating or setting means comprising a fatty acid of less than three carbon atoms between the successive baths.

9. An improved process as claimed in claim 1 wherein the setting means employed effect substantial dehydration and setting by operating partly or entirely under continuous penetrative osmotic action.

10. The process of claim 1 in which the filamentary material passes from the coating liquid to the coagulant at an incline.

FREDERICK HENRY LANE.
EVELYN WILLIAM MADGE.
EDWARD ARTHUR MURPHY.